United States Patent [19]

Schulz

[11] 4,277,777

[45] Jul. 7, 1981

[54] ALARM COMBINATION LOCK

[75] Inventor: Friedemann J. Schulz, 11 Richard St., Touraine by Gatineau-Pointe, P. Quebec, Canada, J8T 1G3

[73] Assignee: Friedemann Joachim Schulz, Touraine, Canada

[21] Appl. No.: 22,921

[22] Filed: Mar. 22, 1979

[30] Foreign Application Priority Data

May 2, 1978 [CA] Canada .................................. 302427

[51] Int. Cl.[3] .............................................. G05B 1/00

[52] U.S. Cl. ........................ 340/147 MD; 340/149 R; 340/543

[58] Field of Search ........... 340/147 MD, 543, 149 R, 340/164 R

[56] References Cited

U.S. PATENT DOCUMENTS

| | | | |
|---|---|---|---|
| 3,764,982 | 10/1973 | Kidnocker | 340/147 MD |
| 3,781,804 | 12/1973 | Lederer | 340/147 MD |
| 4,152,696 | 5/1979 | Smith | 340/147 MD |

*Primary Examiner*—Harold I. Pitts

*Attorney, Agent, or Firm*—Friedemann Joachim Schulz

[57] ABSTRACT

This invention relates to safety and security systems. Selective analog solid state electronics which permit entry to or exit from a secured area for authorized personal by a sequential push button operation or by coded card reading.

9 Claims, 3 Drawing Figures

ALARM COMBINATION LOCK

SUMMARY OF THE INVENTION

It is the object of this invention to provide an improved, reliable, and versatile electronic security and safety system that is operable from an 8 volt to a 16 volt DC supply using a single selectively generated coded input signal and/or a number of sensing inputs.

The above object is accomplished by providing an apparatus for operating a number of controlled devices, including devices permitting access to/or exit from a controlled area including circuit means for the generation storage and transfer of a single timed input signal and circuit means responsive to this signal and other controlled input devices said apparatus including a coded device which determines the sequence and the number of digits of a selected code or number and a plurality of inputs responsive to local and/or remote sensors comprising circuit means for generating coded outputs to actuate local and/or remote output devices.

BRIEF DESCRIPTION OF THE DRAWINGS

A description of the preferred embodiment is set forth in conjunction with the following drawings which are.

BACKGROUND OF THE INVENTION

At the present time, a number of devices and security systems for controlling entry to or access from a given area, room, building or the like, are available. These systems utilize an electrical key, a magnetic card or push buttons to generate the coded electrical signals for controlling access to and exit from an entrance into a controlled area. All of these systems require some means for generating the correct coded combination of signals to properly operate the system. Some push button operated systems, which are exemplified by the disclosures of U.S. Pat. Nos. 2,855, 588, 2,561,076 and 2,677,814, require that the signals must be entered into the system in a predetermined time span. A system utilizing push buttons and a card key combination is known under U.S. Pat. No. 3,234,516. The push button control systems which are presently known are generally implemented in terms of relay circuits and other electromagnetic elements. These systems have been proven to have limited reliability, to require periodic maintenance and they are relatively noisy. Consequently, they cn be detected and decoded. Canadian Pat. No. 959,556 utilizes logic circuitry to overcome the problem of noisy selection, therefore improving earlier systems. It also features a coded key alternative and an ambush alarm.

SPECIAL ADVANTAGES OF THE PRESENT SYSTEM OVEREXISTING SYSTEMS

The present invention provides an improved, reliable electronic security and safety system that is operable from either push buttons, a coded card or input sensors.

An easy exchangeable coded plug-in device which again has a $2^4$ code number alternative providing a very large number of input code variations ranging from a two digit to a six digit input code number.

The miniaturized solid state printed circuit fibre glass board construction is very rugged and is easily hidden.

The wide supply voltage range (8 v to 16 v DC) and the very low standby current drain (<1 m) make it ideal for remote or standard applications.

The timed, gated and sequentially actuated turn off circuitry of the code generators and amplifiers which require no current after each function.

The limited entry code error correction possibility.

A timed switch array illumination lamp eases the input code selection and provides light for the coded card reader.

The versatile system promotes simple interphasing into existing circuit arrangements with the N/on and N/off switch arrangements and the coded sensing inputs.

The time automatic reset on all sensing circuits when the trigger input is removed.

The four different output codes such as enter, alarm, smoke and fire.

CIRCUIT DESCRIPTION

Figure 1:
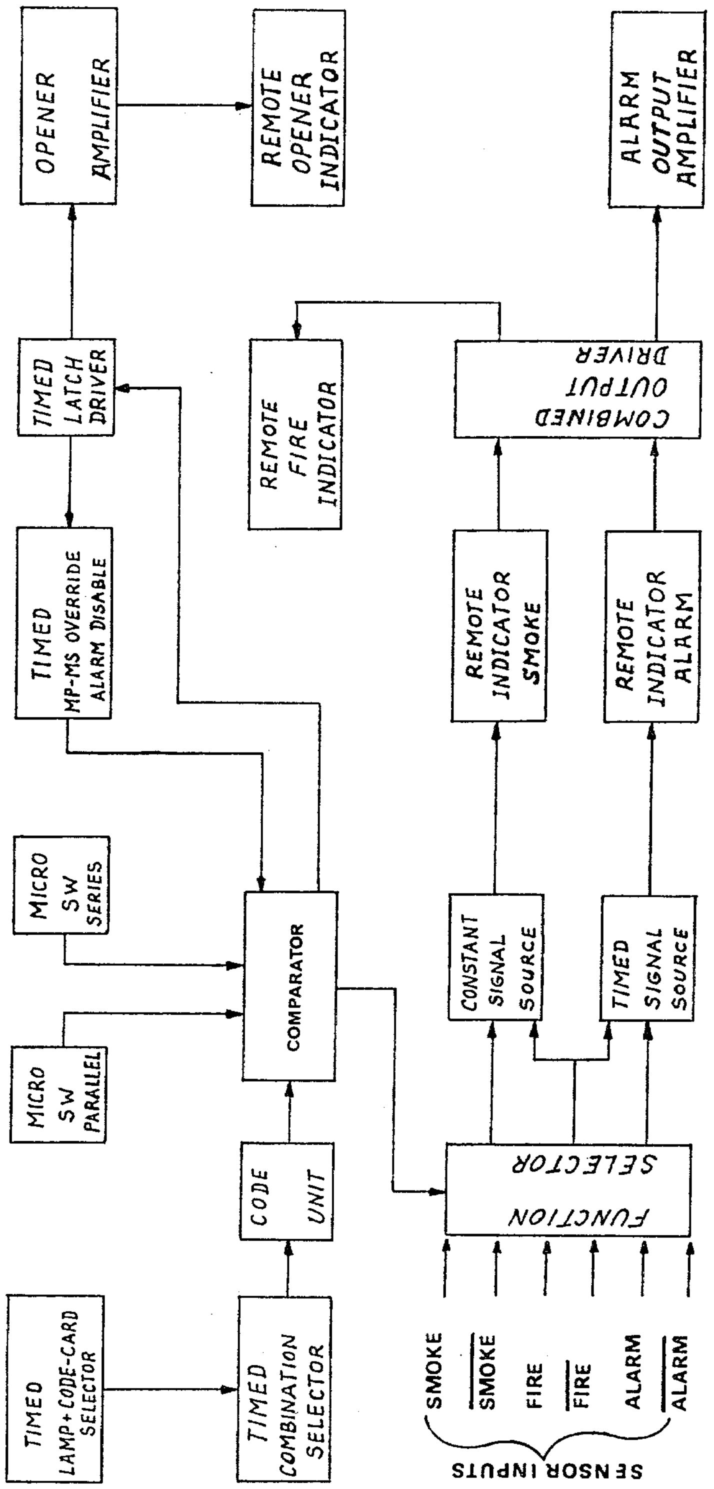
FIG. 1 a block diagram of the complete system.
Figure 2:
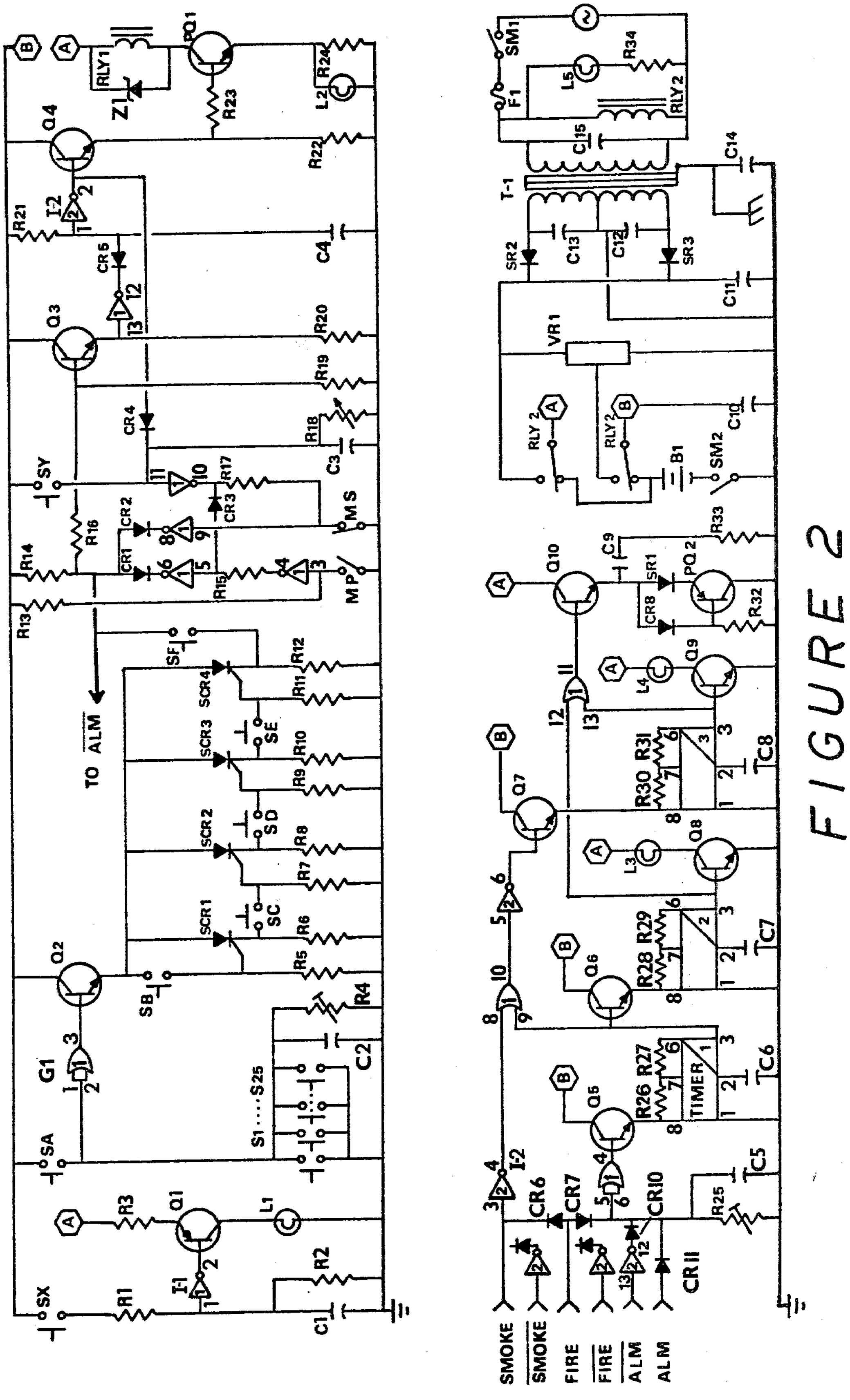
FIG. 2 a schematic diagram illustrating the active circuitry of this invention.
Figure 3:
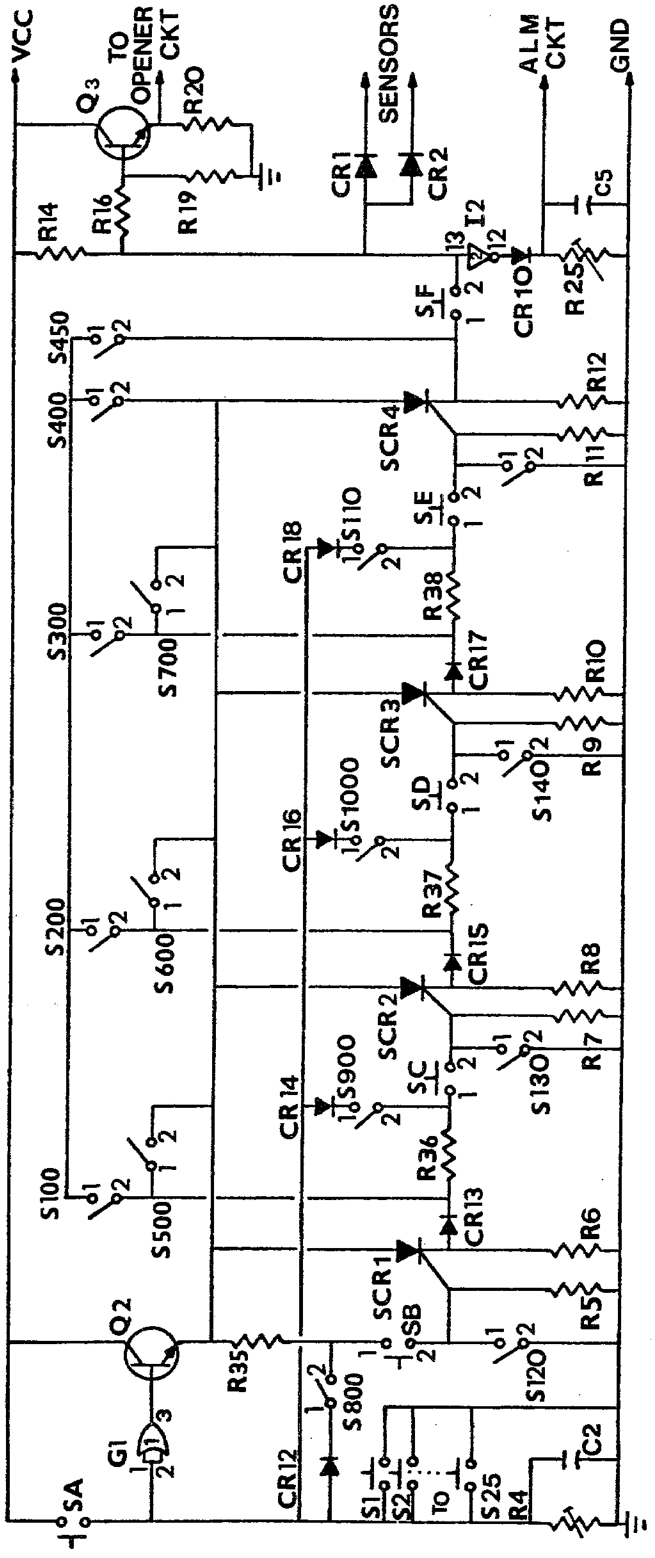
FIG. 3 a detailed schematic diagram of the coded device.

To start the operation, push button switch S-X (FIG. 2) is momentarily actuated and charges C-1 to Vc. $I_1$ and $I_2$ are integrated hex inverter modules. The numbers adjacent to the symbols show pin connections. G-1 is a quad OR Gate. Again, the numbers near the symbols designate pin connections. The inverter module $I_1$, pin 2, provides now a low signal to the base of Q-1 and allows current to flow through R-3, Q-1, and L-1 the push button illumination lamp. R-1 serves as a current limiter while R-2 is part of the timing network C-1, R-2. R-3 is returned to the raw Vc supply. When operated by push buttons, the first circuit is used to provide the light to illuminate the push button array after sundown. When a coded card is used, the circuit doubles as a power source for the card reader. The switches lettered S-A to S-X are in effect the push buttons of the push button array S-1 to S-25. The reasons for using selected letters in place of numbers in FIG. 2 and FIG. 3 are to simplify the tracing of the signal through the coded device and to demonstrate that any number on the push button array may be represented by a lettered symbol.

To gain entry, push button switch A must be actuated. It supplies Vc to most push button switches on the array via a special designed coded device. The exceptions are the sequential code switches B, C, D, E, and F, which may be any one of the switches on the input array. Simultaneously, switch A supplies a Vc potential to C-2, R-4, the timing network and the integrated circuit $G_1$, of which pin 3 drives the base of Q-2. This circuit provides the maximum potential and time available for the transfer of the code signal to the anodes of the Silicon Controlled Rectifier (SCRs). The emitter potential of Q-2 is also applied at switch B. It will fire SCR-1 if switch B is momentarily actuated. The resulting current flow through SCR-1 provides a near VE potential at switch C. When switch C is actuated, the gate of SCR-2 will fire and current will flow through this device providing a near VE potential at switch D. By actuating switch D, the VE potential is again transferred to fire the gate of SCR-3. This turns on the SCR and provides again a high DC potential at switch E. When switch E is actuated, SCR-4 turns on and provides a high potential at F. Any error introduced by following a wrong sequence will remove the DC potential at Q-2 and activate an alarm if switch F is actuated. If an error is noticed before switch F has been actuated, a normal selection of the input code number may be repeated without actuating the alarm. When switch F is actuated and the desired high potential exists at F, the input voltage rises at the base of the tri-state device Q-3 and turns it on. As a result, a high potential exists momentarily at the emitter of Q-3, R-20 and the inverter $I_1$, pin 13. $I_1$, pin 12, provides now a discharge path through CR-5 for the Vc potential that is stored in C-4. Until C-4 is charged through R-21 to about ⅔ of the Vc potential, inverter $I_1$, pin 2, supplied a high signal to the base of Q-4, which provides the voltage and current to the base of PQ-1. This device is the final output amplifier. It operates the door lock RLY-1 and provides along with L-2 a means to register an authorized entry.

Another circuit comes into action if switch F is momentarily actuated and switch F is not positive, as in the case of an expired time, a wrong or incompleted sequence, or if one or more wrong buttons were actuated. In FIG. 2, this circuit is labelled as $\overline{ALM}$.

With switch F actuated, the balanced potential at R-14 and R-16 gets reduced to a low potential. Inverter $I_2$, pin 13, receives this potential and changes it to a high signal at $I_2$, pin 12. CR-10 conducts now and charges timing circuit R-25, C-5 to Vc. This circuit supplies $G_1$, pins 5 and 6, with a high potential. This potential in turn, when applied to the base of Q-5, the NPN driver, provides the voltage and current requirements for the timers $TI_1$ and $TI_2$. The output of $TI_1$, pin 3, provides the base currents for Q-6, the driver and for the slave timer $T_2$. $TI_1$, pin 3, provides furthermore the gating pulse for $G_1$, pin 9, to determine the different output codes for fire, smoke, theft or break-in. With a high at $T_1$, pin 3, Q-6 will conduct and the VE will rise to Vc potential at pin 8 of $TI_2$. Timer $I_2$ will now oscillate at a predetermined frequency, which is set by R-28, R-29, and C-7 for a time interval set by R-26, R-27, and C-6. This will continue until the potential at the base of Q-5 drops below conduction. The output of the tone generator $TI_2$, pin 3, is than coupled to $G_1$-13 and the base of Q-8 to provide the input signal for Q-10. The AC output signal is coupled through C-9 to an output device and returned to ground. The junction of the emitter of Q-10 and SR-1 supplies also the current for remote signaling or latching devices. This system provides furthermore two independently working series and parallel input sensing circuits which are operating as follows:

Provides the right sequence and timing was employed, a high potential will appear at $I_2$, pin 2, and open the latch. A sample of this high potential also passes through CR-4 charging-up the timing network C-3, R-18 and placing a positive potential at $I_1$, pin 11, and SY the delayed entry or exit switch. $I_1$, pin 10, inverts the high potential and applies a low state to R-17, CR-3, MS-1, R-15, and $I_1$, pin 4.

If MS, the series security switches are now opened, the necessary low potential for $I_1$, pin 9, to inhibit an alarm is provided by R-17.

Equally, the high potential asserted by closing any one of the parallel micro-switches (MP) is dropped accross R-15 and clamped to a low state at $I_1$, pin 5, by CR-3 to inhibit the alarm.

If SY is not depressed or no high potential exist at the base of Q-4, no positive potential would be present at $I_1$, pin 11. Therefore, no positive charge on C-3, R-18, would exist and the output at $I_1$, pin 10, the inverter would be positive. If MS-ALM opens, the high potential from $I_1$, pin 10, will also be at $I_1$, pin 9, and cause a low to appear at $I_1$, pin 8, which in turn allows diode CR-2 to conduct, thus lowering the balanced point at switch F, R-14, R-16, and actuates the alarm. The same principle applies to the parallel micro-switches or sensing devices (MP). These two input combinations are representing effectively N-on and N-off switch arrangements and can be used to activate the alarm outputs.

FIG. 3 is the schematic diagram of the coded device and displays in detail the selective entry part of the system.

On this device, a provision has been made to enlarge or reduce the selected entry code number between 2 and 6 digits and to introduce all discarded numbers as additional faults to cause an alarm. As per example, the number 654321 will be introduced here, although any other multi-digit number may be used. For this particular number, the additional combinations of the coded device are $2^4$.

Since only the selected number disables the alarm, all other combinations will cause an alarm. Supposing S-A is activated, than $C_2$ charges up to Vc. This potential appears at the buffer $G_1$, pins 1 and 2. $G_1$, pin 3, provides a stable high input to Q-2, which turns on and provides all SCR's in the system with a highly standby potential. If none of the coded device switches were actuated, the complete code number of the coded device will be used and transferred through the system via the 25 button switch array or as shown on FIG. 3 by following the letters A to F.

If for example the full number 654321 is reduced to number 61, the numbers 5432 must not be introduced or an alarm will result.

In FIG. 3, the number 61 is operable only if S-800 and S-120, S-900 and S-130, S-1000 and S-140, S-110 and S-150, and, S-400 and S-450 are closed while S-100 and S-500, S-200 and S-600, and, S-300 and S-700 are left open. R-35 serves as a buffer between VE of Q-2 and the ground potential if switch B is actuated. To gain entry without sounding an alarm, only switch A (6) and switch F (1) must be operated.

If the number 641 is chosen, switch 800 and S-120, S-500, S-200 and S-450, S-1000 and S-140, and, S-110 and S-150 must be closed, while all other switches must be left open.

To gain entry without sounding an alarm, only switch A (6), C (4), and F (1) must be operated.

If as a last example the number 6421 is chosen, switches S-800 and S-120, S-500, S-200, S-1000 and S-140, and S-300, must be shorted while all other switches should remain open.

To gain entry push button switches A (6), C (4), E (2) and F (1) must be actuated.

Suppose the number 641 is chosen and switch A (6) actuated, and someone not familiar with the secondary code would actuate push button B (5) which is part of the original input code number, the VE potential sustained by C-2, R-4, would be grounded through S-120, S-B, S-800 and CR-12, thus removing any possibility to complete the combination correctly and therefore actuating the alarm.

The embodiments of the invention in which an exclusive property or privilege is claimed are defined as follows:

1. A code device for comparing the sequence and number of digits of a selected multi digit primary coded signal with a predetermined coded sequence and number of digits in said device, comprising a first coded selection means for initiating the operation of said device and for selecting the first digit of the code, time delay means responsive to said first selection means to provide a timed output signal of a predetermined duration, means to connect said timed signal as the operating potential to a plurality of thyristors, additional coded selection means disposed in the gate circuits of said thyristors adopted to trigger a thyristor into conduction and to deactivate the preceeding thyristor, a final coded section means for providing the output from the final thyristor to operate a controllable device, a plurality of additional selection means associated with said coded selection means, means responsive to the operation of one or more of said final additional selection means for terminating the timed output signal whereby an output is generated by said code device to operate the controllable means when all of the coded selection means are operated in the predetermined coded sequence and within the duration of said timed signal, and whereby the operation of the additional selection means or the termination of the timed signal inhibit the operational output from said device.

2. The device of claim 1 wherein the coded selection means and the additional selection means are all push button switches mounted on a panel or an electronic device duplicating such action.

3. The device of claim 1 in combination with a security control system for a controlled area, comprising means responsive to the operational output from said coded device for operating an access control means to limit access to said controlled area, further means responsive to the absence of said operational output to initiate an alarm means upon operation of the final coded selection means whereby an alarm is initiated when an invalid code is selected or when a code is not selected during the duration of the timed signal.

4. The system of claim 3 including gating means responsive to inputs from remote sensors to energize an alarm means wherein the remote sensors comprise smoke sensors, fire sensors intrusion sensors and whereby the alarm means generates a distinctive indication in response to each different input.

5. The system of claim 4 wherein said alarm means generates an additional output signal, means responsive to said additional output signal to actuate remote control means associated with said remote sensors.

6. The system of claim 3 wherein means are provided to indicate an exit from said controlled area and means responsive to said exit indication means for inhibiting said alarm means for a predetermined time period.

7. The system of claim 2 wherein a start switch is provided which when actuated provides energy for the switch panel illumination lamp and for an alternative electronic push button replacement means for a predetermined period of time.

8. The system of claim 3 including means which when actuated is responsive to the operational output of said device to maintain said access control operated and said alarm means inhibited for a time period longer than said timed signal.

9. A code device as defined in claim 1 including a first, second, third and fourth plurality of switch means, one switch means from each plurality and a said coded selection means associated with each thyristor, the first plurality of switch means disposed in the trigger circuit of said associated thyristors to shunt all triggering potentials to ground to thereby hold said associated thyristor in a non conducting state, the second plurality of switch means connected from said timing means via a corresponding one of said coded selection means and a corresponding one of said first plurality of switch means to ground, whereby the operation of a coded selection means when corresponding switch means from said first and second pluralities are actuated terminates said timed signal, the third plurality of switch means are connected from the output of said time delay means via corresponding coded selection means to provide an alternate potential to trigger a corresponding thyristor when a corresponding code selection means is actuated, if the preceeding thyristor is deactivated, a fourth plurality of switch means operable to shunt selected thyristor outputs to trigger other selected thyristors or shunted to the output of said device in accordance with the pattern of activation of said fourth plurality of switch means, whereby said device will provide an operational output for only those digits of said primary code signal selected by said coded selection means and in accordance with the state of actuation of said first, second, third and fourth plurality of switch means to thereby provide an adjustable secondary code derived from said primary code.

* * * * *